(12) United States Patent
Takashima et al.

(10) Patent No.: US 9,212,088 B2
(45) Date of Patent: Dec. 15, 2015

(54) METHOD FOR MANUFACTURING OPTICAL MEMBER

(71) Applicant: CANON KABUSHIKI KAISHA, Tokyo (JP)

(72) Inventors: Kenji Takashima, Tokyo (JP); Zuyi Zhang, Yokohama (JP); Yoshinori Kotani, Yokohama (JP); Akiko Takei, Fujisawa (JP); Akira Sugiyama, Yokohama (JP); Naoyuki Koketsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/365,055

(22) PCT Filed: Dec. 11, 2012

(86) PCT No.: PCT/JP2012/007902
§ 371 (c)(1),
(2) Date: Jun. 12, 2014

(87) PCT Pub. No.: WO2013/088700
PCT Pub. Date: Jun. 20, 2013

(65) Prior Publication Data
US 2014/0299573 A1    Oct. 9, 2014

(30) Foreign Application Priority Data

Dec. 15, 2011  (JP) ................................ 2011-275102
Nov. 1, 2012   (JP) ................................ 2012-241887

(51) Int. Cl.
*B29D 11/00*    (2006.01)
*C03C 15/00*    (2006.01)
(Continued)

(52) U.S. Cl.
CPC ................ *C03C 15/00* (2013.01); *C03C 11/00* (2013.01); *C03C 17/02* (2013.01);
(Continued)

(58) Field of Classification Search
CPC ........ C03C 11/00; C03C 15/00; C03C 17/00; C03C 17/02; G02B 1/113
USPC ........................................ 216/24, 26, 31, 56
See application file for complete search history.

(56) References Cited

U.S. PATENT DOCUMENTS 4,080,188 A    3/1978  Doddato et al.
4,273,826 A *  6/1981  McCollister et al. ...... 428/310.5
(Continued)

FOREIGN PATENT DOCUMENTS

DE    3820547 A1    12/1988
EP     130801 A1     1/1985
(Continued)

OTHER PUBLICATIONS

Minot et al., "Single-layer, gradient refractive index antireflection films effective from 0.35 to 2.5 [mu]", Optical Society of America, Jun. 1976, pp. 515-519, vol. 66, No. 6.
(Continued)

*Primary Examiner* — Binh X Tran
(74) *Attorney, Agent, or Firm* — Canon U.S.A. Inc., IP Division

(57) ABSTRACT

The present invention provides a method for producing a porous glass layer easily, wherein a ripple is suppressed.
A method for manufacturing an optical member provided with a porous glass layer on a base member includes the steps of forming an intermediate layer containing at least one of silicon, potassium, and aluminum on the base member, forming a phase-separable glass layer on the intermediate layer, forming a phase-separated glass layer on the base member by heating the intermediate layer and the phase-separable glass layer at a temperature higher than or equal to the glass transition temperature of the phase-separable glass layer, and forming a porous glass layer on the base member by subjecting the phase-separated glass layer to an etching treatment.

8 Claims, 5 Drawing Sheets

(51) Int. Cl.
  *C03C 11/00* (2006.01)
  *C03C 17/02* (2006.01)
  *C03C 17/34* (2006.01)
  *C03C 23/00* (2006.01)
  *G02B 1/113* (2015.01)
  *G02B 1/118* (2015.01)

(52) U.S. Cl.
  CPC .......... *C03C 17/3411* (2013.01); *C03C 23/008* (2013.01); *G02B 1/113* (2013.01); *G02B 1/118* (2013.01); *C03C 2217/425* (2013.01); *C03C 2217/732* (2013.01); *C03C 2217/91* (2013.01); *C03C 2218/33* (2013.01); *G02B 2207/107* (2013.01)

(56) References Cited

U.S. PATENT DOCUMENTS

| | | | | |
|---|---|---|---|---|
| 4,313,748 | A * | 2/1982 | Macedo et al. | 65/30.1 |
| 4,778,777 | A * | 10/1988 | Eguchi et al. | 501/39 |
| 5,516,350 | A | 5/1996 | Onoda et al. | |
| 7,132,374 | B2 * | 11/2006 | Mak et al. | 438/784 |
| 2004/0096672 | A1 * | 5/2004 | Lukas et al. | 428/446 |
| 2005/0146730 | A1 | 7/2005 | Endo et al. | |
| 2007/0063453 | A1 | 3/2007 | Ishikawa et al. | |
| 2011/0042301 | A1 * | 2/2011 | Zhang et al. | 210/500.21 |

FOREIGN PATENT DOCUMENTS

| | | | |
|---|---|---|---|
| EP | 0721112 | A2 | 7/1996 |
| JP | S56-092138 | A | 7/1981 |
| JP | 64-083583 | A | 3/1989 |
| JP | H01-192775 | A | 8/1989 |
| JP | H03-115139 | A | 5/1991 |
| JP | 2002-160941 | A | 6/2002 |
| JP | 2006193341 | A | 7/2006 |
| WO | 00/13768 | A1 | 3/2000 |

OTHER PUBLICATIONS

Tengzelius Rohe V et al., "Development of Porous Antireflective Films on Soda-Lime-Silica Glass", Journal of the American Ceramic Society, Feb. 1984, pp. 142-146, vol. 67, No. 2, Columbus, Ohio, USA.

Mukherjee, S.P., "Gel-derived single-layer antireflection films with a refractive index gradient", Thin Solid Films, (1981), pp. L89-L90.

Minot, Michael Jay, "Single-layer, gradient refractive index antireflection films effective from 0.35 to 2.5 [mu]", J. Opt.Soc.Am., Jun. 1976, pp. 515-519, vol. 66, No. 6.

* cited by examiner

METHOD FOR MANUFACTURING OPTICAL MEMBER

TECHNICAL FIELD

The present invention relates to a method for manufacturing an optical member provided with a porous glass layer on a base member.

BACKGROUND ART

In recent years, the industrial utilization of porous glasses as adsorbing agents, microcarrier supports, separation films, optical materials, and the like has been highly anticipated. In particular, porous glasses have a wide utilization range as optical members because of a characteristic of low refractive index.

As for a method for manufacturing a porous glass relatively easily, a method taking advantage of a phase separation phenomenon has been mentioned. A typical example of a base material for the porous glass exhibiting the phase separation phenomenon is borosilicate glass made from silicon oxide, boron oxide, an alkali metal oxide, and the like. In production, the phase separation phenomenon is induced by a heat treatment in which a molded borosilicate glass is held at a constant temperature (hereafter referred to as a phase separation treatment), and a non-silicon oxide rich phase, which is a soluble component, is eluted through etching with an acid solution. The skeleton constituting the thus produced porous glass is primarily silicon oxide. The skeleton diameter, the hole diameter, and the porosity of the porous glass have influences on the reflectance and the refractive index of the light.

NPL 1 discloses a configuration in which the porosity of a porous glass simple substance is controlled in etching in such a way that elution of a non-silicon oxide rich phase is allowed to become insufficient partly and, thereby, the refractive index increases from the surface toward the inside. Consequently, reflection at a porous glass surface is reduced.

Meanwhile, PTL 1 discloses a method for forming a porous glass layer on a base member. Specifically, a film containing borosilicate glass (phase-separable glass) is formed on a base member by a printing method, and a porous glass layer is formed on the base member by a phase separation treatment and an etching treatment.

In the case where several micrometers of porous glass layer is formed on the base member as described in PTL 1, when light is incident on the porous glass surface, the light reflected at the porous glass surface interferes with the light reflected at the interface between the base member and the porous glass, so that a ripple (interference fringe) occurs.

CITATION LIST

Patent Literature

PTL 1: Japanese Patent Laid-Open No. 01-083583

Non Patent Literature

NPL 1: J. Opt. Soc. Am., Vol. 66, No. 6, 1976

SUMMARY OF INVENTION

Technical Problem

However, even when the method disclosed in NPL 1 is used for the configuration in which a porous glass layer is disposed on a base member, reflected light at the interface between the base member and the porous glass layer is not suppressed and a ripple is not suppressed.

According to the method described in NPL 1, it is difficult to control the degree of proceeding of etching and, therefore, it is difficult to control the refractive index. In addition, a non-silicon oxide rich phase, which is a soluble component, remains and, thereby, the water resistance is degraded, so that problems, e.g., clouding, in the use as an optical member occur.

The present invention provides a method for manufacturing an optical member including a porous glass layer on a base member easily, wherein a ripple is suppressed.

Solution to Problem

A method for manufacturing an optical member provided with a porous glass layer on a base member, according to an aspect of the present invention, includes the steps of forming an intermediate layer containing at least one of silicon, potassium, and aluminum on the base member, forming a phase-separable glass layer on the above-described intermediate layer, forming a phase-separated glass layer on the above-described base member by heating the above-described intermediate layer and the above-described phase-separable glass layer at a temperature higher than or equal to the glass transition temperature of the above-described phase-separable glass layer, and forming a porous glass layer on the above-described base member by subjecting the above-described phase-separated glass layer to an etching treatment.

Advantageous Effects of Invention

According to aspects of the present invention, a method for manufacturing an optical member including a porous glass layer on a base member easily, wherein a ripple is suppressed, is provided.

Further features of the present invention will become apparent from the following description of exemplary embodiments with reference to the attached drawings.

DESCRIPTION OF EMBODIMENTS

Figure 1:
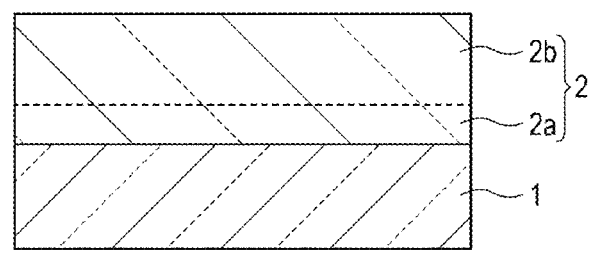
FIG. 1 is a schematic sectional view showing an example of an optical member according to an aspect of the present invention.

The present invention will be described below in detail with reference to the embodiments according to the present invention. Well known or publicly known technologies in the related art are adopted for the portions not specifically shown in the drawings and the descriptions in the present specification.

The term "phase separation" that forms a porous structure according to an aspect of the present invention will be described with reference to an example in which borosilicate glass containing silicon oxide, boron oxide, and an oxide having an alkali metal is used as a glass body. The term "phase separation" refers to separation of a phase with a composition of the oxide having an alkali metal and the boron oxide larger than the composition before the phase separation occurs (non-silicon oxide rich phase) from a phase with a composition of the oxide having an alkali metal and the boron oxide smaller than the composition before the phase separation occurs (silicon oxide rich phase) in the inside of glass, where the structures are on a scale of several nanometers to several ten micrometers. The phase-separated glass is subjected to an etching treatment to remove the non-silicon oxide rich phase, so that a porous structure is formed in the glass body.

The phase separation is classified into a spinodal type and a binodal type. A fine hole of the porous glass obtained by spinodal type phase separation is a through hole connected from the surface to the inside. More specifically, the structure derived from the spinodal type phase separation is an "ant nest"-shaped structure in which holes are three-dimensionally connected. The skeleton made from silicon oxide can be regarded as a "nest" and a through hole can be regarded as a "burrow". Meanwhile, a porous glass obtained by binodal type phase separation has a structure in which independent holes, each surrounded by a closed curved surface substantially in the shape of a sphere, are present in the skeleton made from silicon oxide discontinuously. The hole derived from spinodal type phase separation and the hole derived from binodal type phase separation are determined and distinguished on the basis of the result of observation of their shapes by using an electron microscope. In addition, the spinodal type phase separation and the binodal type phase separation are specified by controlling the composition of the glass body and the temperature in phase separation.

Optical Member

FIG. 1 shows a schematic sectional view of the optical member produced by the manufacturing method according to an aspect of the present invention. The optical member according to an aspect of the present invention is provided with a porous glass layer 2 having a porous structure including continuous holes derived from spinodal type phase separation on a base member 1. The porous glass layer 2 is a low-refractive index film and is expected to be utilized as an optical member because reflection at the interface between the porous glass layer 2 and the air is suppressed. However, in such an optical member, a ripple phenomenon occurs, where an interference fringe appears in the reflected light because of an interference effect of the light reflected at the surface of the porous glass layer 2 and the light reflected at the interface between the base member 1 and the porous glass layer 2. In particular, this interference effect is enhanced and the ripple phenomenon appears considerably in the case where the thickness of the porous glass layer 2 is more than or equal to the wavelength of light and less than or equal to several ten micrometers. When the reflectance is measured and a graph is prepared while the horizontal axis indicates the wavelength and the vertical axis indicates the reflectance, the ripple is represented by the shape in which the magnitude fluctuates periodically like a sinusoidal wave (refer to Comparative example 1 in FIG. 7). If such a ripple is present, the wavelength dependence of the reflectance is enhanced, and suitability for the optical member may be degraded.

The optical member according to an aspect of the present invention has a configuration in which a porous glass layer 2 includes a first region 2a having a porosity changing continuously and a second region 2b having a constant porosity sequentially from the base member 1 side and, in the first region 2a, the porosity increases continuously from the base member 1 side toward the second region 2b. According to this configuration, a sharp change in the refractive index at the interface between the base member 1 and the porous glass layer 2 is suppressed and reflection at this interface is suppressed. As a result, it is possible to suppress a ripple due to interference of the light reflected at the surface of the porous glass layer 2 with the light reflected at the interface between the base member 1 and the porous glass layer 2.

It is desirable that the first region 2a be 100 nm or more, and preferably 200 nm or more. If the first region 2a is less than 100 nm, a change in refractive index at the interface between the base member 1 and the porous glass layer 2 becomes sharp, and reflection at this interface is not suppressed easily. According to measurement of the optical characteristics, in the case where a region in which the porosity changes is 200 nm or more, an effect of suppressing a ripple is observed more considerably.

It is desirable that the second region 2b be 100 nm or more in order to obtain surface characteristics exhibiting both high surface strength and a high porosity (low refractive index).

The thickness of the porous glass layer 2 is not specifically limited, and is preferably 200 nm or more and 50.0 micrometers or less, and more preferably 300 nm or more and 20.0 micrometers or less. If the thickness is less than 200 nm, a porous glass layer 2 exhibiting an effect of suppressing a ripple and having high surface strength and a high porosity (low refractive index) is not obtained. If the thickness is more than 50.0 micrometers, an effect of haze increases and the handleability as an optical member is degraded.

As for the thickness of the porous glass layer 2, specifically, a scanning electron microscope (FE-SEM S-4800, produced by Hitachi, Ltd.) is used and a SEM image (electron micrograph) at an acceleration voltage of 5.0 kV is taken. The thickness of the glass layer portion on the base member of the taken image is measured at 30 or more points and the average value thereof is used.

The porosity of the second region 2b of the porous glass layer 2 is not specifically limited, and is preferably 30% or more and 70% or less, and more preferably 40% or more and 60% or less. If the porosity is less than 30%, the advantages of the porosity are not fully utilized. If the porosity is more than 70%, the surface strength tends to be reduced unfavorably. The porosity of the porous glass layer of 30% or more and 70% or less corresponds to the refractive index of 1.05 or more and 1.25 or less.

The term "porous glass layer has a constant porosity" refers to that a difference in porosity in the film thickness direction in the layer is less than 1%. Put another way, a difference in porosity between any two regions in the layer is less than 1%.

The porosity of the first region 2a can increase from the porosity of the second region 2b toward the base member 1 continuously, and it is desirable that the porosity at the interface to the base member 1 is 0% or more and 5% or less in order to enhance the effect of suppressing a ripple.

The electron microscopy image is binarized into a skeleton portion and a hole portion. Specifically, the scanning electron microscope (FE-SEM S-4800, produced by Hitachi, Ltd.) is used and the porous glass is subjected to surface observation at an acceleration voltage of 5.0 kV at a magnification of 100,000× (50,000× in some cases), where shading of the skeleton is observed easily.

Figure 2:
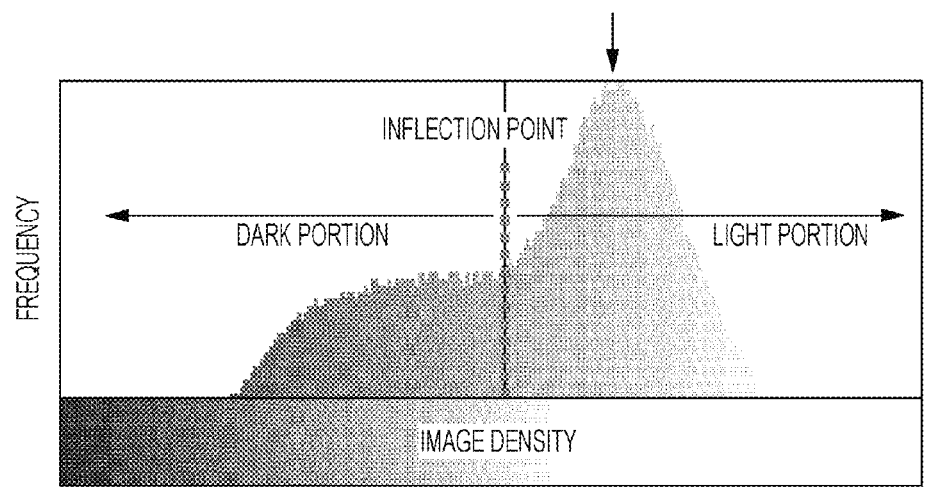
FIG. 2 is a diagram illustrating a porosity.

The observed image is stored as an image, and the SEM image is made into a graphical form on the basis of the frequency of image density by using image analysis software. FIG. 2 is a diagram showing the frequency on the basis of the image density of a porous glass having a spinodal type porous structure. In FIG. 2, the peak portion indicated by an arrow in the downward direction of the image density corresponds to the skeleton portion located at the front.

The light portion (skeleton portion) and the dark potion (hole portion) are binarized into white and black, where an inflection point near the peak position is taken as a threshold value. An average value of the ratios of the area of dark portion to the area of total portion (sum of areas of white and black portions) of the whole image is determined and is taken as the porosity.

In general, as for the porous glass layer 2, a large porosity in a local region, a large fine hole diameter, and a small skeleton diameter are equivalent in many cases, so that a portion having a large porosity has a large hole diameter or a small skeleton diameter.

The average hole diameter of the porous glass layer 2 is preferably 1 nm or more and 200 nm or less, and more preferably 5 nm or more and 100 nm or less. If the average hole diameter is less than 1 nm, the characteristics of the porous structure are not fully utilized. If the average hole diameter is more than 200 nm, the surface strength tends to be reduced unfavorably. In this regard, the average hole diameter can be smaller than the thickness of the porous glass layer.

Figure 3A:
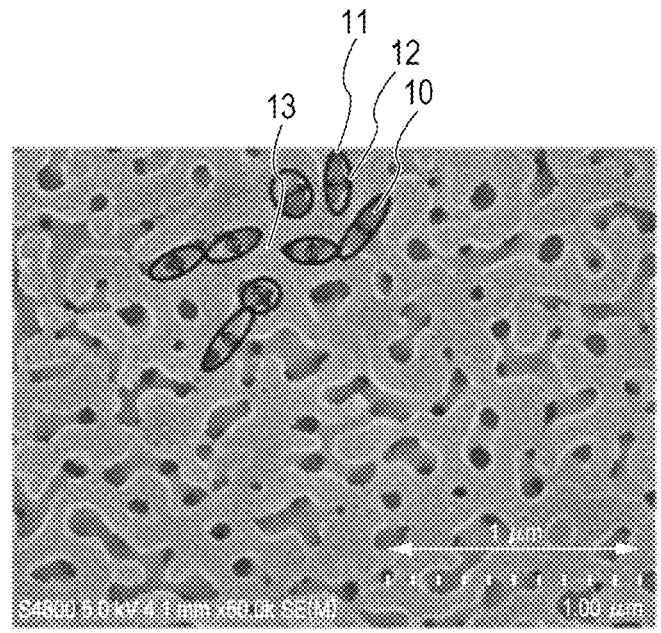
FIG. 3A is a diagram illustrating an average hole diameter.

The average hole diameter in the present invention is defined as an average value of the minor axes of a plurality of approximated ellipses, where holes in the porous body surface are approximated by the plurality of ellipses. Specifically, for example, as shown in FIG. 3A, an electron micrograph of the porous body surface is used, holes 10 are approximated by a plurality of ellipses 11, an average value of the minor axes 12 of the individual ellipses is determined and, thereby, the average hole diameter is obtained. At least 30 points are measured and an average value thereof is determined The average skeleton diameter of the porous glass layer 2 is preferably 1 nm or more and 50 nm or less. If the average skeleton diameter is more than 50 nm, the light is scattered considerably, and the transmittance is reduced significantly. If the average skeleton diameter is less than 1 nm, the strength of the porous glass layer 2 tends to become small.

Figure 3B:
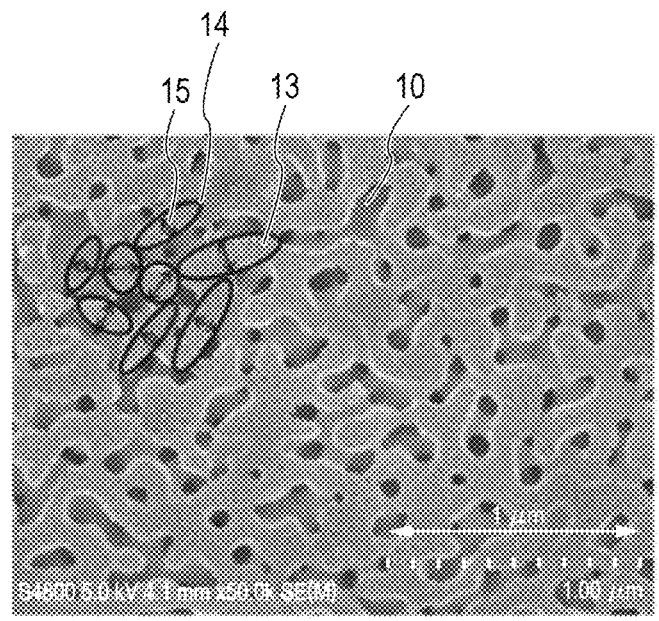
FIG. 3B is a diagram illustrating an average skeleton diameter.

The average skeleton diameter in the present invention is defined as an average value of the minor axes of a plurality of approximated ellipses, where the skeleton of the porous body surface is approximated by the plurality of ellipses. Specifically, for example, as shown in FIG. 3B, an electron micrograph of the porous body surface is used, the skeleton 13 is approximated by a plurality of ellipses 14, an average value of the minor axes 15 of the individual ellipses is determined and, thereby, the average skeleton diameter is obtained. At least 30 points are measured and an average value thereof is determined.

The hole diameter and the skeleton diameter of the porous glass layer 2 may be controlled by the material serving as a raw material and the heat treatment condition in spinodal type phase separation.

In the optical member according to an aspect of the present invention, concave shapes and convex shapes may be further disposed at the interface between the base member 1 and the porous glass layer 2. A film having a refractive index smaller than that of the porous glass layer 2 may be disposed on the surface of the porous glass layer 2.

Specific examples of the optical members according to aspects of the present invention include optical members, e.g., polarizers used in various displays of televisions, computers, and the like and liquid crystal display apparatuses, finder lenses for cameras, prisms, fly-eye lenses, and toric lenses and various lenses of image taking optical systems, observation optical systems, e.g., binoculars, projection optical systems used for liquid crystal projectors and the like, and scanning optical systems used for laser beam printers and the like, in which porous glasses are used.

In particular, the optical members according to aspects of the present invention may be mounted on image pickup apparatuses, e.g., digital cameras and digital video cameras. The image pickup apparatus is provided with an infrared-cut filter and a low-pass filter besides an image pickup element that picks up a subject image. The optical member according to an aspect of the present invention may be formed integrally with the low-pass filter or be formed independently. The optical member may be configured to also serve as a low-pass filter.

Manufacturing Method

The manufacturing method according to an aspect of the present invention includes the steps of forming an intermediate layer containing at least one of silicon oxide, potassium oxide, and aluminum oxide on a base member and forming a phase-separable glass layer on the intermediate layer. Furthermore, the steps of forming a phase-separated glass layer on the base member by heating the intermediate layer and the phase-separable glass layer at a temperature higher than or equal to the glass transition temperature of the phase-separated glass layer and forming a porous glass layer on the base member by acid-treating the phase-separated glass layer are included.

Heating at a temperature higher than or equal to the glass transition temperature in phase separation of the phase-separable glass layer induces mutual component diffusion between the intermediate layer and the phase-separable glass layer, so that a composition change occurs in the vicinity of the interface between the intermediate layer and the phase-separable glass layer. The composition change due to component diffusion occurs continuously in the region in the vicinity of the interface. Therefore, it is believed that a gradient occurs in the glass composition. As a result, phase separation occurs in the intermediate layer as well, although the composition is different from the composition of the surface of the phase-separable glass layer. Consequently, the proportion between a silicon oxide rich phase and a non-silicon oxide phase, the ratio of sizes, and the like are different and a structure in which the porosity changes appears in the resulting porous glass layer. The region in which the composition changes extends to the phase-separable glass layer, so that the thickness of the first region in the porous glass layer is larger than or equal to the thickness of the intermediate layer.

As described above, a structure in which a sharp change in the refractive index at the interface between the base member and the porous glass layer is suppressed is obtained easily by disposing the intermediate layer in which component diffusion is induced and performing heating at a temperature higher than or equal to the glass transition temperature, so that the optical member is produced easily, wherein a ripple is suppressed.

Each step of the method for manufacturing an optical member according to an aspect of the present invention will be described below in detail with reference to the drawings.

Step of Forming Intermediate Layer

Figure 4A:
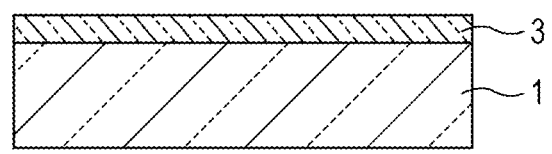
FIG. 4A is a schematic sectional view illustrating an example of a method for manufacturing an optical member according to an aspect of the present invention.

As shown in FIG. 4A, the intermediate layer 3 is formed on the base member 1, while containing a component diffusible into the phase-separable glass layer which is formed later. The component diffusible into the phase-separable glass layer, which is formed later, is a component diffusible into the phase-separable glass layer during a heat treatment, which is performed later, at a temperature higher than or equal to the glass transition temperature. The component concerned, more specifically, the intermediate layer contains at least one of silicon, potassium, and aluminum. In this regard, silicon, potassium, and aluminum may be contained as oxides in the intermediate layer. That is, the intermediate layer contains at least one of silicon oxide, potassium oxide, and aluminum oxide. Alternatively, silicon, potassium, and aluminum may be contained in the intermediate layer while being in the form of nitrides, carbides, and the like.

In the case where silicon is used as a diffusible component, boron, sodium, or both of the two can be further contained in the intermediate layer because a diffusion reaction is facilitated. In the case where 95% or more of silicon oxide and boron oxide are contained in the intermediate layer, when the mole number of silicon and the mole number of boron in terms of element are compared, the mole number of boron can be larger than the mole number of silicon because the boron component may be eliminated by vaporization during the heat treatment. Specifically, the molar ratio of boron to silicon is preferably 2.0 or more and 6.0 or less.

In the case where the intermediate layer contains silicon and potassium, aluminum, or both of the two, for example, they may be contained as oxides having the following functions in the intermediate layer. That is, silicon oxide functions as a network former oxide, potassium oxide functions as a network modifier oxide, and aluminum oxide functions as an intermediate oxide. Addition of the network modifier oxides and the intermediate oxides besides the network former oxides is more effective for fine structure control. When the mole number of silicon and the mole number of potassium or aluminum in terms of element are compared, the mole number of potassium or aluminum can be larger than the mole number of silicon. Specifically, the molar ratio of potassium or aluminum to silicon is preferably 1.0 or more and 6.0 or less.

In the case where the intermediate layer does not contain silicon, but contains potassium, aluminum, or both of the two, the ratio of the individual contents thereof is not limited.

All manufacturing methods, e.g., a printing method, a vacuum evaporation method, a sputtering method, a spin coating method, and a dip coating method, capable of forming a film are mentioned as the method for forming the intermediate layer. Any manufacturing method may be used insofar as the manufacturing method achieves the structure according to an aspect of the present invention.

The thickness of the intermediate layer is not specifically limited insofar as the thickness has an influence on phase separation of the phase-separable glass layer which is formed later, and is preferably 100 nm or more and less than or equal to the thickness of the phase-separable glass layer formed thereon. If the thickness is less than 100 nm, the amount of component which acts on the phase-separable glass layer decreases and the composition change region is reduced. If the thickness is more than the thickness of the phase-separable glass layer, the adhesion between the base member 1 and the porous glass layer 2 may be degraded.

The intermediate layer according to an aspect of the present invention may be a film of homogeneous component or be a heterogeneous film, and be a single layer film or a stacked film. In the case of the stacked film, films having the same component may be stacked or films having different components may be stacked.

An effect of suppressing a strain of the phase-separated glass layer due to a heat treatment in the phase separation step and an effect of enabling adjustment of the film thickness of the porous glass layer with ease are obtained by using the base member 1.

A base member made from any material may be used as the base member 1 in accordance with the purpose. The material for the base member is not specifically limited and, for example, quartz glass, quartz, and sapphire can be employed from the viewpoints of heat resistance and strength. The base member 1 is so-called non-porous and has no holes.

As for the shape of the base member 1, a base member having any shape may be used insofar as the porous glass layer 2 is formed. The shape of the base member 1 may have a curvature.

The softening temperature of the base member can be higher than or equal to the heating temperature (phase separation temperature) in the phase separation step described later, and especially, be higher than or equal to the temperature determined by adding 100 degrees (celsius) to the phase separation temperature. In the case where the base member is a crystal, the fusion temperature is specified to be the softening temperature. If the softening temperature is lower than the phase separation temperature of the porous glass layer 2, a strain of the base member 1 may occur in the phase separation step unfavorably. The phase separation temperature refers to a maximum temperature of the heating temperatures to induce spinodal type phase separation.

The base member 1 can have resistance to etching of the phase-separated glass layer.

Step of Forming Phase-Separable Glass Layer

Figure 4B:
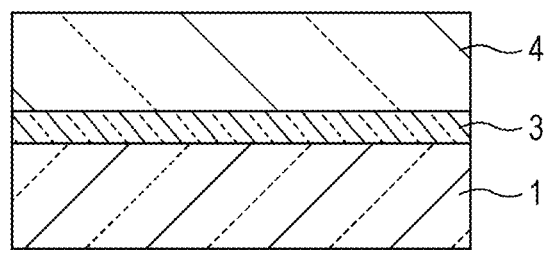
FIG. 4B is a schematic sectional view illustrating an example of a method for manufacturing an optical member according to an aspect of the present invention.

As shown in FIG. 4B, a phase-separable glass layer 4 is formed on the intermediate layer 3.

A term "phase separation property" refers to a property that phase separation is induced by a heat treatment. Examples of phase-separable glasses include silicon oxide based glass I (silicon oxide-boron oxide-alkali metal oxide), silicon oxide based glass II (silicon oxide-boron oxide-alkali metal oxide-(at least one type of alkaline-earth metal oxide, zinc oxide, aluminum oxide, and zirconium oxide)), silicon oxide based glass III (silicon oxide-phosphate-alkali metal oxide), and titanium oxide based glass (silicon oxide-boron oxide-calcium oxide-magnesium oxide-aluminum oxide-titanium oxide). Among them, borosilicate based glass composed of silicon oxide-boron oxide-alkali metal oxide can be used as a base material glass. In particular, the borosilicate based glass having a composition in which the proportion of silicon oxide is 55.0 percent by weight or more and 95.0 percent by weight or less, and especially 60.0 percent by weight or more and 85.0 percent by weight or less can be employed. In the case where the proportion of silicon oxide is in the above-described range, phase-separated glass having high skeletal strength tends to be obtained easily and, therefore, is useful in applications where the strength is required.

Meanwhile, the above-described intermediate layer 3 contains silicon oxide, but does not have always the phase separation property.

All manufacturing methods, e.g., a printing method, a vacuum evaporation method, a sputtering method, a spin coating method, and a dip coating method, capable of forming a glass layer are mentioned as examples of the method for forming the phase-separable glass layer 4. Any manufacturing method may be used insofar as the structure according to an aspect of the present invention is achieved.

It is necessary that a hole structure derived from spinodal type phase separation be formed in the porous glass layer 2 on the base member 1. For this purpose, careful composition control of glass is desired and a method in which, after a glass composition has been established, a glass powder is produced, the resulting powder is applied to the base member 1, and a film is formed by fusion can be employed.

The step of forming the phase-separable glass layer 4 by forming a film of a phase-separable glass powder, which primarily contains base glass obtained by mixing and fusing raw materials for forming porous glass layer according to an aspect of the present invention, will be described below. Specifically, a glass paste containing at least the phase-separable glass powder, which primarily contains base glass obtained by mixing and fusing raw materials for forming porous glass layer, and a solvent is applied to the base member 1 and, thereafter, the above-described solvent is removed, so as to form the phase-separable glass layer 4.

The printing method, the spin coating method, the dip coating method, or the like is mentioned as an example of a method for forming the phase-separable glass layer 4. Explanations will be made below with reference to a method by using a common screen printing method as an example. In the screen printing method, the phase-separable glass powder is made into a paste and is printed by using a screen printing machine. Therefore, adjustment of the paste is necessary.

As for a method for manufacturing the base glass serving as the phase-separable glass powder, the base glass may be produced by a known method except that a raw material is prepared to have the composition of the above-described phase-separable glass. For example, production may be performed by heating and fusing the raw material containing supply sources of the individual components and, as necessary, by molding the raw material into a predetermined form. In the case where heating and fusing are performed, the heating temperature may be set appropriately in accordance with the raw material composition and the like, and usually the heating temperature is preferably within the range of 1,350 degrees (celsius) to 1,450 degrees (celsius), and especially 1,380 degrees (celsius) to 1,430 degrees (celsius).

The base glass is pulverized into a glass powder in order to be used as a paste. The pulverizing method is not specifically limited and a known pulverizing method may be used. Examples of pulverizing methods include liquid phase pulverizing methods using a bead mill and vapor phase pulverizing methods using a jet mill The paste contains a thermoplastic resin, a plasticizer, a solvent, and the like in addition to the above-described glass powder.

It is desirable that the proportion of the glass powder contained in the paste be within the range of 30.0 percent by weight or more and 90.0 percent by weight or less, and preferably 35.0 percent by weight or more and 70.0 percent by weight or less.

The thermoplastic resin contained in the paste is a component that enhances the film strength after drying and imparts flexibility. As for the thermoplastic resin, polybutyl methacrylate, polyvinyl butyral, polymethyl methacrylate, polyethyl methacrylate, ethyl cellulose, and the like may be used. These thermoplastic resins may be used alone or in combination.

Examples of plasticizers contained in the paste include butylbenzyl phthalate, dioctyl phthalate, diisooctyl phthalate, dicapryl phthalate, and dibutyl phthalate. These plasticizers may be used alone or in combination.

Examples of solvent contained in the paste include terpineol, diethylene glycol monobutyl ether acetate, and 2,2,4-trimethyl-1,3-pentanediol monoisobutyrate. The above-described solvents may be used alone or in combination.

The paste may be produced by kneading the above-described materials at a predetermined ratio.

A glass powder film may be formed by applying the thus produced paste to the base member 1 by using a screen printing method and drying and removing the solvent component of the paste. The phase-separable glass layer 4 is formed by fusing the powder of the glass powder film. In fusion of the glass powder film, a heat treatment can be performed at a temperature higher than or equal to the glass transition temperature of the phase-separable glass powder film. If the temperature is lower than the glass transition temperature, fusion does not proceed and a smooth glass layer tends not to be formed.

The phase-separable glass layer 4 may be crystallized because of the heat treatment in formation of the phase-separable glass layer 4 and, thereby, phase separation in the phase-separable glass layer 4 may be hindered in a phase separation treatment performed later. That is, when the phase-separable glass layer 4 is in a crystal state, phase separation does not occur easily because the phase separation phenomenon of the glass occurs in an amorphous state.

Consequently, in the case where the phase-separable glass layer 4 is formed by fusing the glass powder film, it is necessary to select a heat-treating method in which fusion is induced while the amorphous state of the glass is maintained.

Examples of this method include a method in which the heat treatment is performed at a temperature lower than or equal to the crystallization temperature and a method in which quenching is performed from a fused state at a high temperature. Among them, the method in which the heat treatment is performed at a temperature lower than or equal to the crystallization temperature can be employed from the viewpoints of film formation at a lower temperature and easiness in control.

Removal of a solvent component of the paste may be performed at the same time with the phase separation treatment performed later. In that case, the glass powder film corresponds to the phase-separable glass layer 4. Meanwhile, in order to achieve a pre-determined film thickness, the glass paste may be repeatedly applied an appropriate number of times and be dried.

The temperature and the time of the drying and removal of the solvent may be changed appropriately in accordance with the solvent employed, although the drying can be performed at a temperature lower than the decomposition temperature of the thermoplastic resin. If the drying temperature is higher than the decomposition temperature of the thermoplastic resin, glass particles are not fixed, and when a glass powder layer is formed, occurrences of defects and unevenness tend to become considerable.

Step of Forming Phase-Separated Glass Layer

Figure 4C:
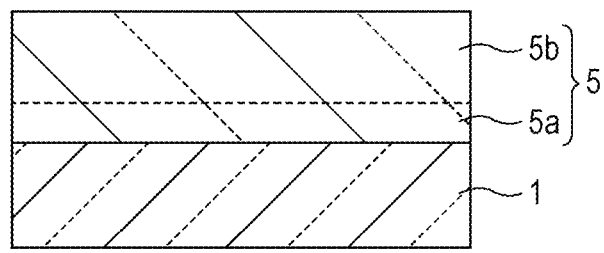
FIG. 4C is a schematic sectional view illustrating an example of a method for manufacturing an optical member according to an aspect of the present invention.

As shown in FIG. 4C, the intermediate layer 3 and the phase-separable glass layer 4 are subjected to a heat treatment at a temperature higher than or equal to the glass transition temperature of the phase-separable glass layer 4, so as to form a phase-separated glass layer 5 by phase separation. Alternatively, the thermoplastic resin may be removed and, in addition, the glass powder film may be fused and phase-separated by subjecting the phase-separable glass layer 4 (glass powder film) to a heat treatment, so as to form the phase-separated glass layer 5.

As described above, component diffusion is induced between the intermediate layer 3 and the phase-separable glass layer 4 by this step, so that a composition change occurs in the vicinity of the interface between the intermediate layer 3 and the phase-separable glass layer 4. As a result, a structure in which the porosity changes appears in the resulting porous glass layer 2.

Here, the phase-separated glass layer 5 refers to a glass layer phase-separated into a silicon oxide rich phase and a non-silicon oxide rich phase in the inside. As shown in FIG. 4C, the phase-separated glass layer 5 includes a region 5a in which a silicon oxide component changes and a region 5b in which a silicon oxide component is constant sequentially from the base member 1 side, and the region 5a corresponds to the above-described region in which the composition change have occurred.

In aspects of the present invention, the intermediate layer 3 and the phase-separable glass layer 4 can be subjected to a heat treatment at a temperature higher than or equal to the glass transition temperature of the phase-separable glass layer 4 in order to facilitate the phase separation treatment.

More specifically, the phase separation step is performed by maintaining a temperature of 500 degrees (celsius) or higher and 700 degrees (celsius) or lower for 2 hours or more to 70 hours or less.

As described above, in this phase separation step, the solvent component of the paste may be removed from the glass powder film. In this case, the heating temperature in the phase separation step can be lower than or equal to the crystallization temperature.

The heating temperature is not necessarily a constant temperature. The temperature may be changed continuously, or a plurality of steps at different temperatures may be employed. In order to facilitate composition diffusion between the intermediate layer 3 and the phase-separable glass layer 4, a high-temperature heat treatment (first heat treatment) may be performed at an initial stage of the phase separation step and, thereafter, a low-temperature heat treatment (second heat treatment) may be performed. That is, the phase separation step may include the first heat treatment and the second heat treatment, and the first heat treatment may be performed prior to the second heat treatment and, thereby, a heat treatment may be performed at a temperature higher than the heat treatment temperature of the second heat treatment.

Step of Forming Porous Glass Layer

Figure 4D:
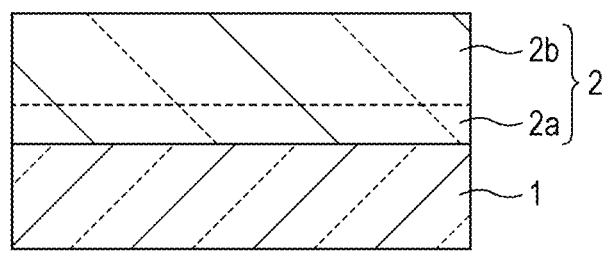
FIG. 4D is a schematic sectional view illustrating an example of a method for manufacturing an optical member according to an aspect of the present invention.

As shown in FIG. 4D, a step in which the phase-separated glass layer 5 is subjected to an etching treatment and, thereby, the porous glass layer 2 having continuous holes is obtained is performed. The non-silicon oxide rich phase is removed by the etching treatment while the silicon oxide rich phase of the phase-separated glass layer 5 remains. The remaining portion serves as a skeleton of the porous glass layer 2 and the portion from which the non-silicon oxide rich phase has been removed serves as a hole of the porous glass layer 2. The porous glass layer 2 includes a first region 2a in which the porosity changes continuously and a second region 2b in which the porosity is constant sequentially from the base member 1 side. The first region 2a is a porous structure derived from the region 5a and the second region 2b is a porous structure derived from the region 5b.

In general, the etching treatment to remove the non-silicon oxide rich phase is a treatment to elute the non-silicon oxide rich phase, which is a soluble phase, through contact with an aqueous solution. In general, the method for bringing the aqueous solution into contact with the glass is a method in which the glass is immersed in the aqueous solution, although not specifically limited insofar as the glass is brought into contact with the aqueous solution in the method. For example, the glass may be coated with the aqueous solution. As for the aqueous solution required for the etching treatment, known solutions, e.g., water, acid solutions, and alkaline solutions, capable of dissolving the non-silicon oxide rich phase may be used. A plurality of types of step to bring the glass into contact with these aqueous solutions may be selected in accordance with uses.

In the etching treatment of common phase-separated glass, an acid treatment is used favorably from the viewpoints of a small load on an insoluble phase (silicon oxide rich phase) and the degree of selective etching. The non-silicon oxide rich phase, which is an acid-soluble component, is removed through elution because of contact with an acid solution, while corrosion of the silicon oxide rich phase is relatively small, so that high selective etchability is ensured.

Examples of acid solutions can include inorganic acids, e.g., hydrochloric acid and nitric acid. As for the acid solution, usually, an aqueous solution by using water as a solvent can be employed. Usually, the concentration of the acid solution may be specified to be within the range of 0.1 mol/L or more and 2.0 mol/L or less appropriately. In the acid treatment step, the temperature of the acid solution may be specified to be within the range of 20 degrees (celsius) or higher and 100 degrees (celsius) or lower and the treatment time may be specified to be 1 hour or more and 500 hours or less.

Several hundred nanometers of silicon oxide film, which hinders etching, may be generated on the glass surface after the phase separation treatment depending on the glass composition. This surface silicon oxide layer may be removed by polishing, an alkali treatment, or the like.

Gel silicon oxide film may deposit on the skeleton depending on the glass composition. If necessary, a multistage etching method using acid etching solutions having different acidities or water may be employed. Etching may be performed at etching temperatures of 20 degrees (celsius) or higher and 95 degrees (celsius) or lower. Ultrasonic waves may be applied during the etching treatment, if necessary.

In general, a water treatment (Etching step 2) can be performed after a treatment with an acid solution, an alkaline solution, or the like (Etching step 1) is performed. In the case where the water treatment is performed, adhesion of residual components to a porous glass skeleton is suppressed and a porous glass layer having a higher porosity tends to be obtained.

In general, the temperature in the water treatment step is preferably within the range of 20 degrees (celsius) or higher and 100 degrees (celsius) or lower. The duration of the water treatment step is specified appropriately in accordance with the composition, the size, and the like of the glass concerned and may be usually about 1 hour to 50 hours.

The structure of the thus produced optical member, that is, a change in the porosity in the vicinity of the interface between the base member 1 and the porous glass layer 2 is examined on the basis of a broken-out section of the glass by using an observation techniques, e.g., a scanning electron microscope (SEM) and a transmission electron microscope (TEM).

EXAMPLES

The present invention will be described below with reference to the examples.

However, the present invention is not limited to the examples.

Base Member A

A quartz base member (produced by IIYAMA PRECISION GLASS CO., LTD., softening point 1,700 degrees (celsius), Young's modulus 72 GPa) was used as a base member. The base member having a thickness of 1.1 mm was used after being cut into the size of 50 mm×50 mm and being subjected to mirror finishing.

Production of Phase-Separable Glass Powder A

A mixed powder of a quartz powder, boron oxide, sodium oxide, and alumina was fused in a platinum crucible at 1,500 degrees (celsius) for 24 hours, where the charge composition was specified to be 64 percent by weight of $SiO_2$, 27 percent by weight of $B_2O_3$, 6 percent by weight of $Na_2O$, and 3 percent by weight of $Al_2O_3$. The fused glass was poured into a graphite mold after the temperature was lowered to 1,300 degrees (celsius). Standing to cool was performed in air for about 20 minutes, keeping was performed in a slow cooling furnace at 500 degrees (celsius) for 5 hours, and thereafter, cooling was performed for 24 hours. The resulting block of the borosilicate glass was pulverized by using a jet mill until the average particle diameter became 4.5 micrometers, so as to obtain Glass powder A. The crystallization temperature of Glass powder A was 800 degrees (celsius).

Production of Glass Paste A

Glass powder A: 60.0 parts by mass

Alpha-terpineol: 44.0 parts by mass

Ethyl cellulose (registered trademark ETHOCEL Std 200 (produced by Dow Chemical Company)): 2.0 parts by mass The above-described raw materials were agitated and mixed, so as to obtain Glass paste A. The viscosity of Glass paste A was 31,300 mPas.

Sol Solution A

Tetraethoxysilane (TEOS), hydrochloric acid, and ethanol were mixed and were agitated for 6 hours. Thereafter, 4-methyl-2-pentanol (4M2P) and 2-ethylbutanol (2EB) were mixed, so as to form a silicon oxide diluted solution. Subsequently, tetraethoxyboron (TEB), hydrochloric acid, and ethanol were mixed and were agitated for 6 hours. Thereafter, 4-methyl-2-pentanol (4M2P) and 2-ethylbutanol (2EB) were mixed, so as to form a boron diluted solution. The two solutions were mixed and were agitated for 3 hours, so as to form Sol solution A. The molar ratio of silicon to boron in terms of element of Sol solution A was 1:4.

Sol Solution B

A boron diluted solution was formed by mixing TEB and sodium ethoxide and was mixed with Sol solution A, so as to prepare Sol solution B. The molar ratio of silicon to boron to sodium in terms of element was adjusted to become 1:4:1.

Sol Solution C

TEOS, hydrochloric acid, and ethanol were mixed and were agitated for 6 hours. Thereafter, 4M2P and 2EB were mixed, so as to form a silicon oxide diluted solution. Subsequently, TEB, potassium ethoxide, hydrochloric acid, and ethanol were mixed and were agitated for 6 hours. Thereafter, 4M2P and 2EB were mixed, so as to form a boron diluted solution. The two solutions were mixed and were agitated for 3 hours, so as to form Sol solution C. The molar ratio of silicon to boron to potassium in terms of element of Sol solution C was adjusted to become 1:4:1.

Sol Solution D

Aluminum sec-butoxide, 4M2P, and ethyl 3-oxobutanoate were mixed at a molar ratio of 1:11:1 and were agitated for 3 hours, so as to prepare Sol solution D. The resulting sol solution contains only aluminum.

Example 1

Sol solution A was applied to the base member A, and film was formed by a spin coating method. This operation was repeated two times and, thereafter, heating was performed at 100 degrees (celsius) for 10 minutes, so as to form an intermediate layer. The film thickness of the intermediate layer was about 250 nm.

Glass paste A was applied to the intermediate layer 3 by screen printing. A printing machine employed was MT-320TV produced by Micro-tec Co., Ltd. A plate 30 mm×30 mm of #500 and a solid image were used. The solvent was dried by standing in a drying furnace at 100 degrees (celsius) for 10 minutes. The thickness of the resulting film was 10.00 micrometers on the basis of SEM measurement. In a resin removal step, the temperature of this film was raised to 350 degrees (celsius) at a temperature raising rate of 5 degrees (celsius)/min, and a heat treatment was performed for 3 hours, so as to form a phase-separable glass layer.

The temperatures of the base member, the intermediate layer, and the phase-separable glass layer were raised to 700 degrees (celsius) at a temperature raising rate of 5 degrees (celsius)/min, and a heat treatment was performed for 1 hour. Thereafter, the temperature was lowered to 600 degrees (celsius) at a temperature lowering rate of 10 degrees (celsius)/min, and a heat treatment was performed at 600 degrees (celsius) for 50 hours. The outermost surface of the film was polished, so as to obtain a phase-separated glass.

The phase-separated glass layer was immersed in a 1.0 mol/L nitric acid aqueous solution heated to 80 degrees (celsius) and was stood for 24 hours while being kept at 80 degrees (celsius). Then, the phase-separated glass layer was immersed in distilled water heated to 80 degrees (celsius) and was stood for 24 hours. The glass body was taken out of the solution and was dried at room temperature for 12 hours, so as to obtain Sample A.

Figure 5:
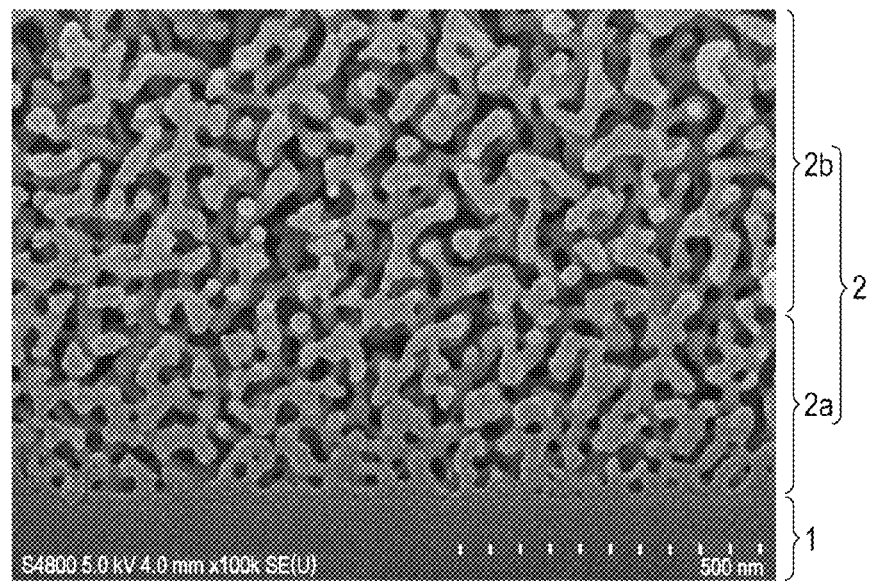
FIG. 5 is an electron micrograph of a cross-section of Sample A produced in Example 1.

FIG. 5 shows an electron microscope observation diagram (SEM image) of a part of a cross-section of the base member and the porous glass layer of Sample A.

According to observation of Sample A with SEM, a porous glass layer having a film thickness of 2.0 micrometers was disposed on the base member. It was ascertained that the porosity in the vicinity of the porous glass layer surface was large as compared with the porosity in the vicinity of the interface between the base member and the porous glass layer. It was ascertained that the porosity changed gently over a range of 400 nm or more from the interface between the base member and the porous glass layer.

The porosity of each of Region A located in the inside of the porous glass layer at a distance of about 240 nm from the interface between the base member and the porous glass layer, Region B located in the inside of the porous glass layer at a distance of about 360 nm from the interface, Region C located in the inside of the porous glass layer at a distance of about 500 nm from the interface, and Region D located in the inside of the porous glass layer at a distance of about 200 nm from the surface of the porous glass layer was calculated on the basis of binarization of the image.

Region A: 33.9%
Region B: 47.0%
Region C: 55.8%
Region D: 56.2%

Example 2

In Example 1, Sol solution A was used in formation of the intermediate layer. However, Sol solution B was used in the present example. Sample B was obtained through the same steps as the steps in Example 1 except that described above.

According to observation of Sample B with SEM, a porous glass layer having a film thickness of 3.0 micrometers was disposed on the base member. It was ascertained that the porosity in the vicinity of the porous glass layer surface was large as compared with the porosity in the vicinity of the interface between the base member and the porous glass layer. It was ascertained that the porosity changed gently over a range of 500 nm or more from the interface between the base member and the porous glass layer.

Example 3

In Example 1, Sol solution A was used in formation of the intermediate layer. However, Sol solution C was used in the present example. Sample C was obtained through the same steps as the steps in Example 1 except that described above.

According to observation of Sample C with SEM, a porous glass layer having a film thickness of 3.0 micrometers was disposed on the base member. It was ascertained that the porosity in the vicinity of the porous glass layer surface was large as compared with the porosity in the vicinity of the interface between the base member and the porous glass layer. It was ascertained that the porosity changed gently over a range of 200 nm or more from the interface between the base member and the porous glass layer.

Example 4

In Example 1, Sol solution A was used in formation of the intermediate layer. However, Sol solution D was used in the present example. Sample D was obtained through the same steps as the steps in Example 1 except that described above. In this regard, the film thickness of the intermediate layer was about 150 nm.

According to observation of Sample D with SEM, a porous glass layer having a film thickness of 2.0 micrometers was disposed on the base member. It was ascertained that the porosity in the vicinity of the porous glass layer surface was large as compared with the porosity in the vicinity of the interface between the base member and the porous glass layer. It was ascertained that the porosity changed gently over a range of 400 nm or more from the interface between the base member and the porous glass layer.

Comparative Example 1

Sample E was obtained through the same operations as the operations in Example 1 except that the intermediate layer was not disposed on the base member.

According to observation of Sample E with SEM, a porous glass layer having a film thickness of 2.0 micrometers was disposed on the base member. The porosity was substantially the same throughout the whole porous glass layer.

Figure 6:
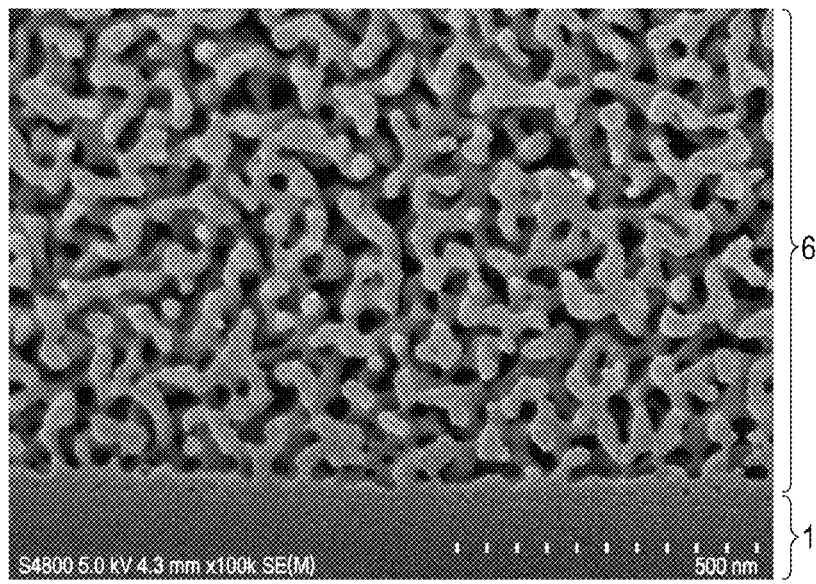
FIG. 6 is an electron micrograph of a cross-section of Sample E produced in Comparative example 1.

FIG. 6 shows an electron microscope observation diagram (SEM image) of a part of a cross-section of the base member 1 and the porous glass layer 6 of Sample E.

As in Example 1, the porosity of each of Region A located in the inside of the porous glass layer at a distance of about 240 nm from the interface between the base member and the porous glass layer, Region B located in the inside of the porous glass layer at a distance of about 360 nm from the interface, Region C located in the inside of the porous glass layer at a distance of about 500 nm from the interface, and Region D located in the inside of the porous glass layer at a distance of about 200 nm from the surface of the porous glass layer was calculated on the basis of binarization of the image.

Region A: 53.1%
Region B: 52.7%
Region C: 53.2%
Region D: 53.5%

Measurement of Reflectance

The reflectance of each of Examples 1 to 4 and Comparative example 1 was measured. A lens reflectance measuring apparatus (USPM-RU, produced by Olympus Corporation) was used in the measurement. Light was incident on the side where the porous glass layer on the base member was present, and the amount of the reflected light thereof was measured. The measurement wavelength region was 400 nm to 750 nm.

Figure 7:
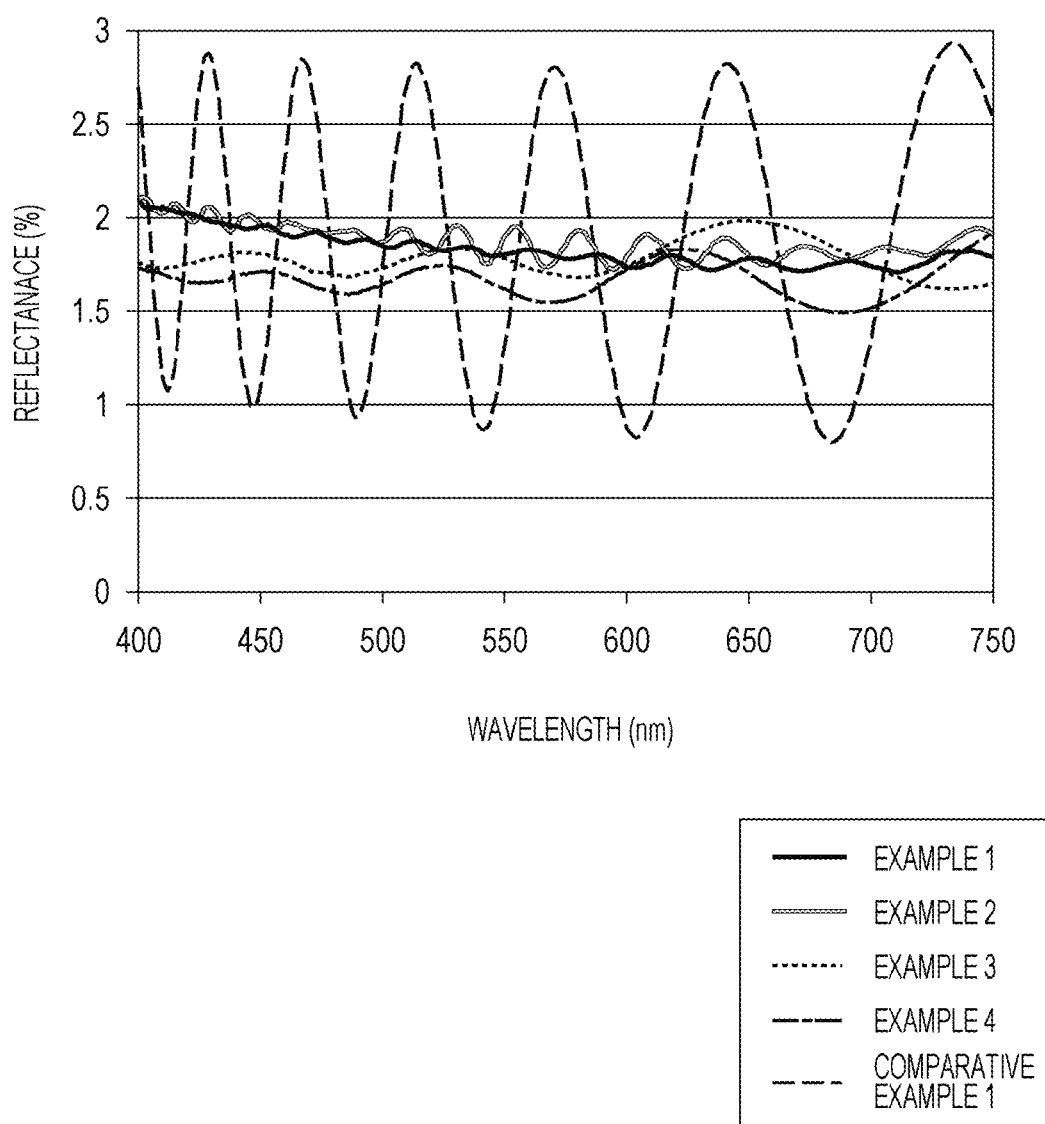
FIG. 7 is a diagram showing the wavelength dependence of reflectance of Examples 1 to 4 and Comparative example 1.

FIG. 7 shows the wavelength dependence of reflectance of each of Samples 1 to 4 and Comparative example 1. It is believed from FIG. 7 that the wavelength dependence of reflectance of each of samples of Examples 1 to 4 is suppressed and a ripple is suppressed as compared with that of the sample of Comparative example 1. It is ascertained that a maximum reflectance of each of samples of Examples 1 to 4 is smaller than that of the sample of Comparative example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275102, filed Dec. 15, 2011 and No. 2012-241887, filed Nov. 1, 2012, which are hereby incorporated by reference herein in their entirety.

Reference Signs List
1 Base member
2 Porous glass layer
3 Intermediate layer
4 Phase-separable glass layer
5 Phase-separated glass layer

The invention claimed is:

1. A method for manufacturing an optical member provided with a porous glass layer on a base member, comprising the steps of:
    forming an intermediate layer containing at least one of silicon, potassium, and aluminum on the base member;
    forming a phase-separable glass layer on the intermediate layer;
    forming a phase-separated glass layer on the base member by heating the intermediate layer and the phase-separable glass layer at a temperature higher than or equal to the glass transition temperature of the phase-separable glass layer; and
    forming a porous glass layer on the base member by subjecting the phase-separated glass layer to an etching treatment,
    wherein, in the forming of the phase-separated glass layer, component diffusion between the intermediate layer and the phase-separable glass layer are induced by heating so that a porosity of the porous glass layer increases from a base member side toward a side opposite to the base member side.

2. The method for manufacturing an optical member according to claim 1,
   wherein a first heat treatment and a second heat treatment are performed in the forming of the phase-separated glass layer, and
   the first heat treatment is a treatment which is performed prior to the second heat treatment and in which heating is performed at a temperature higher than the temperature of the second heat treatment.

3. The method for manufacturing an optical member according to claim 1, wherein the intermediate layer contains silicon and boron.

4. The method for manufacturing an optical member according to claim 3, wherein the molar ratio of boron to silicon is 2.0 or more and 6.0 or less in the intermediate layer.

5. The method for manufacturing an optical member according to claim 1, wherein the intermediate layer contains silicon and potassium.

6. The method for manufacturing an optical member according to claim 5, wherein the molar ratio of potassium to silicon is 1.0 or more and 6.0 or less in the intermediate layer.

7. The method for manufacturing an optical member according to claim 1, wherein the intermediate layer contains silicon and aluminum.

8. The method for manufacturing an optical member according to claim 7, wherein the molar ratio of aluminum to silicon is 1.0 or more and 6.0 or less in the intermediate layer.

\* \* \* \* \*